Nov. 2, 1926.

F. W. PICHÉ

1,605,558

BRAKE MECHANISM

Filed April 23, 1925   2 Sheets-Sheet 1

Inventor
Frank W. Piché
By [signature]
his Attorney

Nov. 2, 1926.
F. W. PICHÉ
1,605,558
BRAKE MECHANISM
Filed April 23, 1925   2 Sheets-Sheet 2
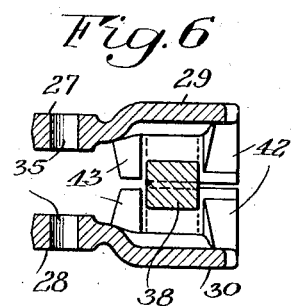
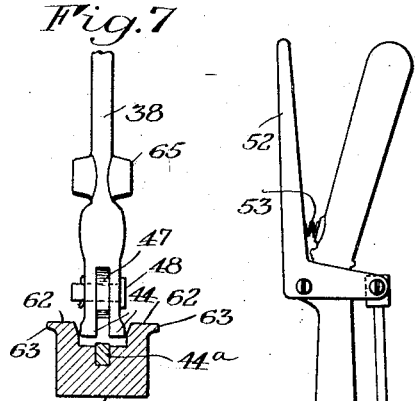
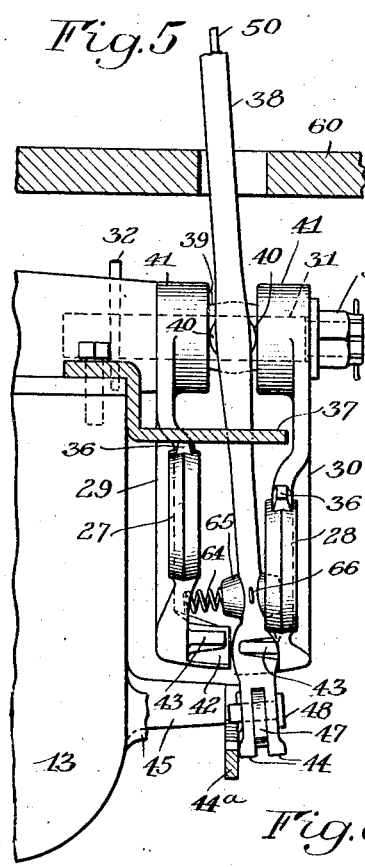
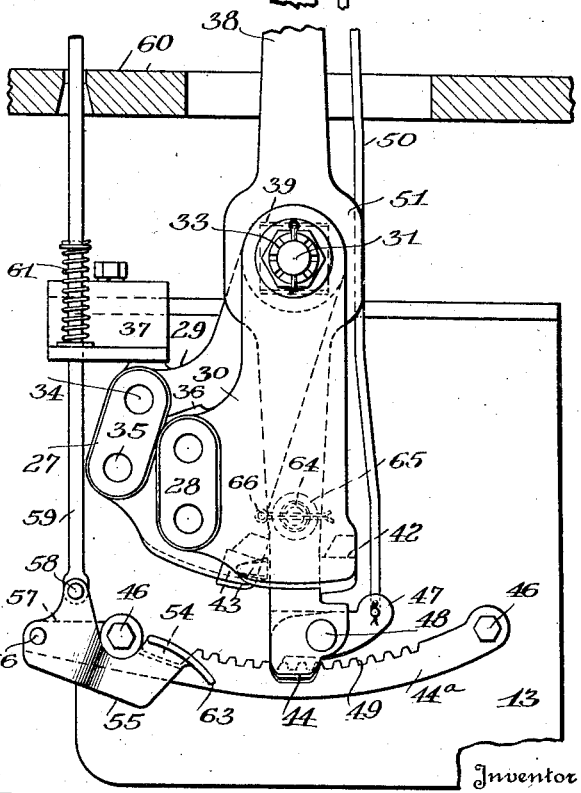
Inventor
Frank W. Piché
By Frederick W. S. Church
his Attorney Patented Nov. 2, 1926.

1,605,558

UNITED STATES PATENT OFFICE.

FRANK W. PICHÉ, OF DETROIT, MICHIGAN.

BRAKE MECHANISM.

Application filed April 23, 1925. Serial No. 25,186.

The present invention relates to brake mechanism, and has for its object to provide an improved brake adapted for use in selectively braking the wheels or traction members of motor vehicles, where one or more of said wheels or members may have lost effective tractive engagement with the ground and it is necessary to rely on the tractive force of the remaining wheels or members to move the vehicle. A further object is to provide an improved brake mechanism adapted to form a combined selective control and speed reducing brake capable of being used for either purpose when desired.

A still further object of the invention is to provide a selective brake mechanism of a simple and economical form of construction, particularly adapted for use with motor vehicles, tractors and the like having one or more sets of traction wheels or members, certain of which may from time to time require individual braking for different reasons while others are being driven to move the vehicle.

A still further object of the invention is to provide an improved selective brake mechanism for motor vehicles, including an operating or control mechanism adapted to permit selective operation, only when the control mechanism is at a predetermined point or points in its range of movement and further to provide improved means which may if desired be used to positively prevent selective operation until such means is manually or otherwise released by the operator.

To these and other ends the invention resides in certain improvements and combinations of parts, all as will be hereinafter more fully described, the novel features being pointed out in the claims at the end of the specification.

In the drawings:—

Figure 4 is a side elevation similar to Figure 2 showing the operating lever in one of its selective brake applying positions;

Figure 5 is a rear elevation of the operating mechanism shown in Figure 4, with certain parts shown in section;

Figure 6 is a sectional plan taken on line 6ª—6ª of Figure 2;

Figure 7 is a rear elevational view of the operating lever and guard therefor shown in section, and Figure 8 is a top plan view of the lever guard shown in Figure 4.

Similar reference numerals thoughout the several views indicate the same parts.

Figure 1:
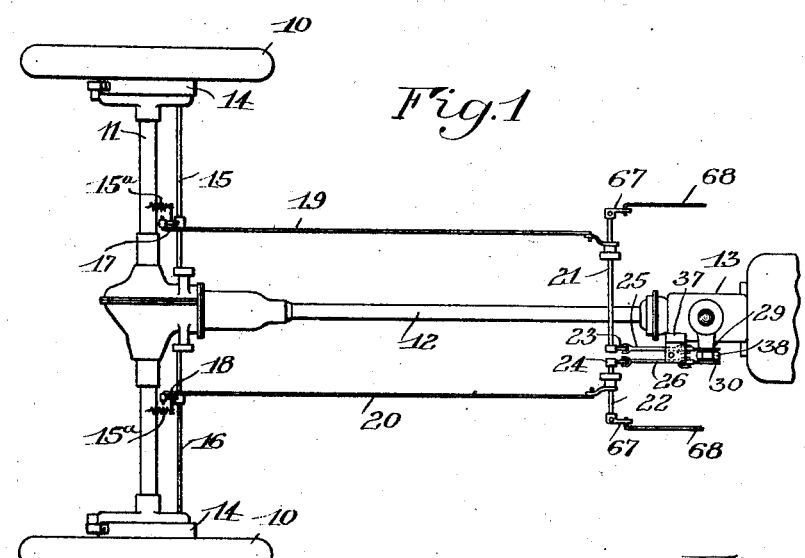
Figure 1 is a diagrammatic plan illustrating in part a motor vehicle chassis to which the present invention is shown applied.
Figure 2:
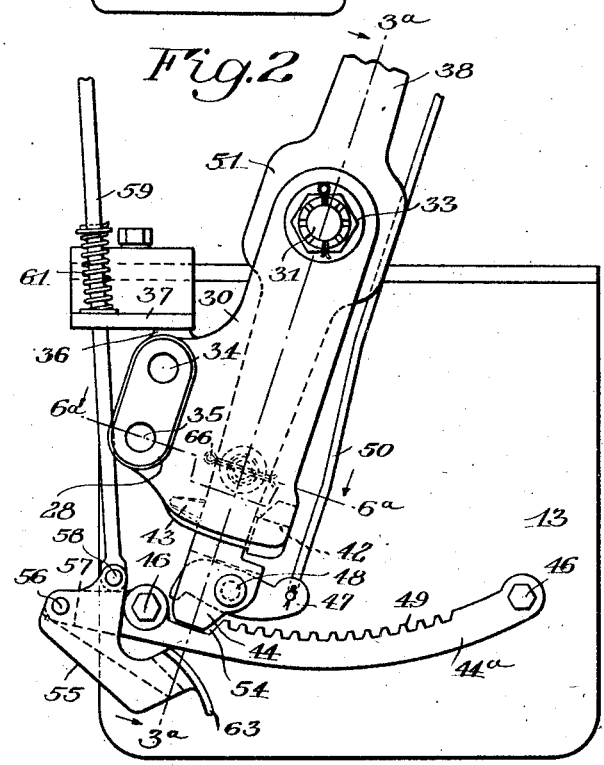
Figure 2 is a fragmentary side elevation illustrating one embodiment of the improved brake control mechanism in which the operating parts are shown in normal release position.

In the drawings illustrating the present embodiment of the invention I have shown in Figure 1 a portion of a chassis or frame of any preferred form embodying in the present instance a pair of wheels 10, a differential driving axle 11, torque tube 12, transmission casing cover 13 and rear brakes, indicated generally at 14. The present invention is especially applicable to the internal or emergency brakes of the vehicle though not necessarily limited to this particular type. The invention is employed in connection with the usual transversely extending brake shafts 15 and 16 which are adapted to operate the internal brakes and which are provided with arms 17 and 18, respectively, with which the forwardly extending brake rods 19 and 20 are connected. Brake release springs may be provided either within or without the brake drums, preferably as shown at 15ª between the axle 11 and arms 17 and 18. The front end of the rod 19 is suitably connected with a transverse shaft 21 and the rod 20 with another transverse shaft 22. The shafts 21 and 22 are provided with arms 23 and 24, respectively, from which extend the relatively short pull rods 25 and 26, adapted for connection with my improved brake operating or control means as will hereinafter appear, the present invention being an improvement on that shown in an application filed by me March 5th, 1925, Serial No. 13060.

In Figure 4 the position of the parts as illustrated is that in which one brake has been applied while the other is shown in normal release position, thus affording an example of selective braking. In this construction the inner and outer pull rods 25 and 26 are arranged for connection with the lateral extensions 27 and 28 of a pair of spaced brake actuating arms or parts 29 and 30 which constitute short levers adapted to swing upon a pivot pin or bolt 31 projecting from one side of the transmission casing cover 13 or other suitable support and held within a recess formed therein by suitable securing means 32. The outer end of the pivot pin is provided with suitable retaining means for the arms or parts 29 and 30 as shown at 33. The lateral extensions 27 and 28 of the arms 29 and 30 are preferably provided with upper and lower pin receiving holes 34 and 35, respectively, the upper of which is in advance of the lower when the arms are in brake release position as shown by the arm 29 in Figure 4, whereby to vary the effective length of the pull rods as the brake bands become worn. Each of the arms is provided with a boss or projection 36 for engagement with a stop in the form of a bracket 37 secured to the casing 13, whereby to limit the action of the brake release springs 15$^a$ in returning the brakes to normal inoperative position.

A brake operating or control lever 38 is mounted upon the pivot pin 31 between the arms 29 and 30, both for a pivotal and a rocking movement, the lever preferably having a squared or rectangular opening therethrough to receive a block 39 loosely sleeved upon the pivot pin 31 and of the same general rectangular shape as the opening but having its upper and lower faces convexly curved to permit lateral movement of the lever whereby it may have three different operating planes in any of which it is adapted for a back and forth pivotal movement to effect control of the brakes as will hereinafter appear. The operating lever is also provided adjacent its pivot point with four convex lugs or projections 40, two on each side, for engagement with the inner faces of the enlarged portions 41 of the arms 29 and 30 to reduce friction between the lever and said parts whereby to facilitate rocking of the lever from one position to another and at the same time affording suitable means for holding the arms properly spaced apart at their upper ends. The arms 29 and 30 are each provided at their lower ends with inwardly disposed forwardly and rearwardly positioned lugs 42 and 43, respectively, the inner ends of the two sets of lugs terminating in slightly spaced relation to afford suitable clearance between the same when the arms are in registering position. The forward lugs 42 are made somewhat heavier than the rear lugs 43 since through them the arms are actuated during application of the brakes, the rear lugs being provided to insure positive return of the arms by the operating lever independently of the pull thereon by the brake release springs 15$^a$. It will be understood of course that if the operating lever is swung forwardly and rearwardly while in central position it will actuate both arms, whereby to apply both brakes simultaneously, but that either arm may be actuated independently of the other to afford selective braking if the lever is inclined sufficiently to remove its lower end entirely from between the lugs of the arm opposite to the one to be actuated.

The operating lever is forked at its lower end or provided with spaced extensions 44 adapted to straddle a lock bar 44$^a$ spaced from and suitably supported preferably by extensions 45 on the transmission casing 13, to which the bar is connected by bolts 46. A latch or lock 47 is provided for the lever which is pivotally disposed between the extensions 44 upon a pin 48 extending therethrough. The latch is adapted to engage the teeth 49 of the bar to lock the lever, only when the latter is in position to engage the lugs of both arms 29 and 30, or when the lever is in vertical position, in which it is moved to effect simultaneous application of the several brakes provided. Release of the latch is effected by a vertically disposed rod 50, preferably guided in a groove formed in the front face of the enlarged fulcrum portion 51 of the lever, the rod being operated by a small bell crank 52 pivoted on the operating lever 38 adjacent the hand grip thereof and actuated by a spring 53 to normally maintain the latch 47 in locking position.

Movement of the operating lever 38 to either of its inclined selective braking positions is permitted only when the lever is in one or more predetermined positions upon its pivot, one such position being provided in the present instance. This is afforded by omitting the teeth at the rear end of the lock bar and providing a recess 54 therein, which is made deep enough to permit the lower extensions 44 of the lever to pass over the bar at this point when the lever is moved laterally to either of its inclined or selective braking positions. The recess is of course advantageously provided at a point to permit the lever to be swung directly from normal brake release position into either of the selective positions before being moved to apply the brakes. In other words, when in said normal release position it can be moved, without lateral shifting, to apply the several brakes simultaneously, or moved to either side of the lock bar and then forwardly to effect individual application of the brakes.

Means has been provided for preventing accidental movement of the brake operating lever to selective position since it has been found that in moving the same from normal release position to apply the several brakes simultaneously the operator may sometimes exert a lateral pull thereon instead of a straight pull in the vertical plane in which he desires to move the lever. Such a pull might, at the initial operation of the lever, throw it into selective braking position, since its lower end at this time is opposite the recess 54 in the lock bar 44ª. A guard for the lever has therefore been provided as indicated at 55, which will prevent its lateral movement until the guard is first manually or otherwise released by the operator. The guard is pivoted at 56 on an extension 57 of the lock bar 44ª and is also pivoted at 58 to an operating rod 59 projected up through the horizontal flange of the bracket 37 and through an opening in the floor 60 of the vehicle at a point convenient to the operator, preferably in a position where he can depress the same by a foot movement when it is desired to move the operating lever to one of the selective braking positions provided. A spring 61 mounted upon the rod 59 and seated upon the bracket 37 serves to return the guard to normal position when the rod is released. The guard is provided with upstanding portions 62 on each side of the lock bar 44ª and these upstanding portions are provided with curved laterally extending flanges 63 adapted to be engaged by the lower extensions 44 of the lever only when the latter is being returned to released position from one of its selective brake applying positions. The upstanding portions 62 of the guard are spaced far enough apart to permit the lower end of the operating lever to pass therebetween when the lever is moved in a vertical plane, as when moving to and from position to apply and release the several brakes simultaneously. When, however, the lever is returned to normal release position from either of the selective brake applying positions one or the other of the extended portions 44 will engage the curved flange 63 in the path thereof and automatically depress the guard which will subsequently be elevated by the spring 61 as soon as the lever is moved laterally back to vertical position. Upward movement of the guard 55 by the spring 61 is limited by the lock bar 44ª through its engagement with the lower face thereof.

Means for automatically centering the operating lever when the latter is moved from either selective brake applying position to a point opposite the recess 54 is provided, preferably in the form of a spring 64 extending through the lower end of the operating lever and having its opposite ends slidably disposed upon the inner faces of the arms 29 and 30, so that the spring may freely move with the lever when the latter is swung upon its pivot. The spring which has a considerable bearing within the lever by reason of the lateral boss-like projections 65 thereon is held centrally thereof by a pin 66 extended therethrough and through the spring so as to afford compression of the opposite ends of the spring according to the direction in which the lever is inclined, whereby the lever is forced back to vertical position when in registry with the recess 54 of the lock bar 44ª, thus making it unnecessary for the driver to effect this operation when returning the lever from either of its selective braking positions.

Figure 3:
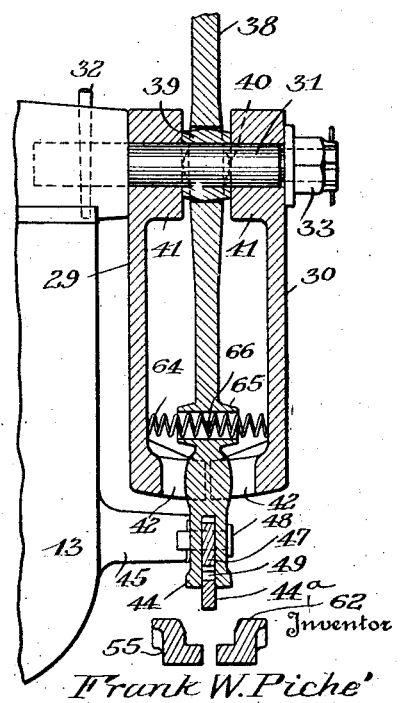
Figure 3 is a sectional elevation taken on line 3ª—3ª of Figure 2.

In the operation of the brake, assuming that it is desired to effect application of the right hand brake only as viewed in Figure 1, the operator will depress the rod 59 to release the guard 55 and will then rock the lever 38 until its lower end is opposite the recess 54 of the lock bar 44ª. The lever can then be inclined to the position shown in Figure 5 so that its lower end will lie on the right side of the lock bar and between the lugs of the operating arm 30 so that by exerting a rearward pull on the upper end of the lever the operating connections 26 and 20 will be actuated to apply the right hand brake. Before effecting release of the brake, the guard may be permitted to return to normal position by the action of the spring 61. Subsequently in releasing the brake the lower end of the lever 38 will automatically depress the guard after which said lever can be swung back to upright position as shown in Figure 7 and then returned to normal inoperative position. The operation of applying the left hand brake is the same as that described above except that the control lever will be inclined in the opposite direction for this operation. In the normal operation of applying both brakes at the same time, the lever 38 is operated in the plane indicated in Figure 3 without depressing the guard.

While I have shown brakes on one set of wheels only, which are preferably the rear or traction wheels of the vehicle, it will be understood that I do not limit the application of my invention to the brakes of any particular number of wheels or traction members, as it will be evident to those skilled in the art that the front or other brakes, not shown, may be readily connected up with suitable crank arms 67 disposed on the operating shafts 21 and 22 having suitable pull rods 68 which may be employed to effect application of such additional brakes as may be desired, or if preferred the operating arms 29 and 30 may be connected directly with an additional set of brakes either forwardly or rearwardly of the arms.

I claim as my invention:

1. The combination with a vehicle frame having a plurality of traction members and brakes therefor including different actuating parts, of an operating device for said actuating parts mounted for movement in different operating planes whereby to effect operation of said actuating parts one independently of another, locking means for said operating device and releasable control means therefor independent of the locking means and adapted to normally prevent shifting of the operating device to one of said positions.

2. The combination with a vehicle frame having a plurality of traction members and brakes therefor including different actuating parts, of an operating device mounted for movement in different planes to effect operation of the actuating parts, one independently of another, locking means for the operating device, a portion of which is adapted to prevent its movement from one plane to another except when at a predetermined point, and releasable means normally preventing movement of the operating device from said point to one of the planes.

3. The combination with a vehicle frame having a plurality of traction members and brakes therefor including different actuating parts, of an operating device for said actuating parts mounted for movement in different directions from a predetermined point to effect selective operation of said parts, locking means for said device and releasable means independent of said locking means normally in the path of the operating device whereby to prevent its movement in one of said directions.

4. The combination with a vehicle frame having a plurality of traction members and brakes therefor including different actuating parts, of an operating device for said actuating parts mounted for movement in different directions from a predetermined point to permit selective operation of said parts and also movable from said point to simultaneously operate the parts, locking means for the operating device, and releasable means normally preventing movement of the operating device in either of said directions, but permitting its movement to simultaneously operate said parts.

5. The combination with a vehicle frame having a plurality of traction members and brakes therefor including different actuating parts, of an operating lever for said parts movable in one plane to effect simultaneous operation of the actuating parts and in another plane to effect operation of one part only, locking means for the lever and releasable means independent of the lever normally preventing its movement in the last mentioned plane but permitting it to move in the first mentioned plane.

6. The combination with a vehicle frame having a plurality of traction members and brakes therefor including different actuating parts, of an operating lever movable to different positions to actuate the parts selectively or simultaneously, a latch bar, a latch for the lever adapted to engage the bar to hold the lever in one or more brake applying positions, and manually releasable means independent of the lever and normally preventing selective operation of said parts.

7. The combination with a vehicle frame having a plurality of traction members and brakes therefor including different actuating parts, of an operating lever movable from a predetermined point to actuate the parts simultaneously or selectively, a latch bar, a latch for the lever adapted to engage the bar to hold the lever in one or more brake applying positions, means associated with the lever and adapted to prevent its movement to selective position except when at said predetermined point, and manually releasable means normally preventing movement of the lever to the different selective positions while at said point.

8. The combination with a vehicle frame having a plurality of traction members and brakes therefor including different actuating parts, of an operating member movable from a predetermined point to actuate said parts simultaneously or selectively, means adapted to prevent selective operation of said member when the latter is in advance of said point, and releasable means normally preventing movement of the operating member from said point to selective position.

9. The combination with a vehicle frame having a plurality of traction members and brakes therefor including different actuating parts, of an operating lever movable in different planes to selectively or simultaneously operate said parts, means associated with the lever for maintaining it in one of said planes while moving to brake applying position, and releasable means normally preventing its movement from the last mentioned plane when the lever is at brake release position.

10. The combination with a vehicle frame having a plurality of traction members and brakes therefor including different actuating parts, of an operating lever adapted for movement in different planes to selectively or simultaneously engage and actuate said parts, a locking bar, a latch for the lever adapted to cooperate with the bar to hold the lever in different brake applying positions, means associated with the lever and cooperating with the bar to maintain the lever in the plane selected while moving to brake applying position, and a releasable spring controlled guard having portions normally preventing movement of the lever to the different selective positions.

11. The combination with a vehicle frame having a plurality of traction members and brakes therefor including a pair of pivoted arms, of an operating lever disposed between said arms and adapted for movement to different positions to separately engage and actuate the arms, and a releasable spring controlled guard having portions adapted to normally lie adjacent the lower end of the lever to prevent its movement to either of said positions.

12. The combination with a vehicle frame having a plurality of traction members and brakes therefor, a pair of pivoted arms operatively connected with the brakes, a latch bar, a lever pivoted between said arms adapted for movement in different planes from a predetermined point to simultaneously or separately engage and operate the arms, the lever being forked at its lower end to straddle said latch bar, a latch pivoted within the fork of the lever and adapted to cooperate with the bar to lock the lever in different braking positions, said fork being adapted to prevent movement of the lever from one plane to the other except when at said point, and operating means for the latch.

13. The combination with a vehicle frame having a plurality of traction members and brakes therefor, a pair of pivoted arms operatively connected with the brakes, spaced lugs on the inner faces of each of the arms, a lever pivoted between the arms and adapted to be inclined upon its pivot so as to separately engage the lugs of each arm to move the latter in opposite directions and adapted when in a central position to engage the lugs of both arms whereby to simultaneously move said arms either forwardly or rearwardly.

14. The combination with a vehicle frame having a plurality of traction members and brakes therefor including different actuating parts, of an operating device for said actuating parts normally disposed in brake release position and selectively movable to different positions to effect separate operation of said parts and a releasable guard for preventing selective operation adapted to be automatically displaced by said operating device when the latter is returned from selective to release position.

15. The combination with a vehicle frame having a plurality of traction members and brakes therefor including different actuating parts, of an operating device for said actuating parts movable in different planes to selectively operate said parts, and a releasable guard for the operating device adapted to prevent movement of the latter from a predetermined point to selective position, the guard being automatically displaced by the operating member when the latter is returned to said point from selective brake applying position.

16. The combination with a vehicle frame having a plurality of traction members and brakes therefor including different actuating parts, of a pivoted operating lever adapted to be actuated while in one plane to engage and operate said parts at the same time and movable from said plane to selectively engage and operate the parts, latching means for the lever and a releasable guard normally preventing movement of the lever from brake release position to selective position and adapted to be automatically displaced by the lever when the latter is returned from selective position to normal release position.

17. The combination with a vehicle frame having a plurality of traction members and brakes therefor including different actuating parts, of a pivoted operating lever adapted to be actuated while in one plane to simultaneously operate said parts and movable from said plane to selectively engage and operate the parts, latching means for the lever and a releasable spring pressed guard normally preventing movement of the lever from brake release position to selective position and adapted to be automatically displaced when the lever is returned from selective position to normal release position, the lever being movable to release position without displacement of the guard when returning from simultaneous operation of the brakes.

18. The combination with a vehicle frame having a plurality of traction members and brakes therefor including different actuating parts, of a pivoted operating lever adapted to be actuated while in one plane to simultaneously operate said parts and movable from said plane to selectively engage and operate the parts, a latch bar for the lever, a latch adapted to cooperate with the bar to lock the lever while in brake applying position in said plane, said latch bar being adapted to prevent movement of the lever to or from selective brake applying position except at a predetermined point, a movable guard for the lever having spaced portions permitting movement of the lever to and from brake release position while in said plane, said portions normally preventing movement of the lever from said point to selectively operate said parts, the guard being automatically displaced by the lever when the latter is returned from selective brake applying position to normal release position, and operating means for manually effecting release of the guard.

FRANK W. PICHÉ.